United States Patent [19]
Skaggs

[11] Patent Number: 5,893,684
[45] Date of Patent: Apr. 13, 1999

[54] REMOVAL TOOL FOR FLUSH RIVETS

[75] Inventor: John M. Skaggs, Rockwall, Tex.

[73] Assignee: Raytheon Company, Lexington, Mass.

[21] Appl. No.: 09/017,866

[22] Filed: Feb. 3, 1998

Related U.S. Application Data

[63] Continuation of application No. 08/674,141, Jul. 1, 1996, Pat. No. 5,743,683.

[51] Int. Cl.$^6$ ............................................. B23B 35/00
[52] U.S. Cl. ........................................ 408/1 R; 408/112
[58] Field of Search ........................ 408/1 R, 14, 84, 408/95, 97, 110, 112, 202, 241 S

[56] References Cited

U.S. PATENT DOCUMENTS

| | | |
|---|---|---|
| 36,903 | 11/1862 | Hadley . |
| 68,504 | 9/1867 | Haworth . |
| 521,206 | 6/1894 | Covel . |
| 1,023,002 | 4/1912 | Bennett . |
| 2,294,303 | 8/1942 | Jagow ............................ 408/112 |
| 2,296,087 | 9/1942 | Burns ................................ 77/5 |
| 2,335,614 | 11/1943 | Spievak ............................ 77/55 |
| 2,359,859 | 10/1944 | Jarvis ............................ 408/112 |
| 2,360,942 | 10/1944 | Ellerstein ........................ 77/55 |
| 2,365,986 | 12/1944 | Wilson ............................ 77/18 |
| 2,372,398 | 3/1945 | Shoffner .......................... 77/55 |
| 2,375,112 | 5/1945 | Kanihan ........................ 408/84 |
| 2,461,716 | 2/1949 | Blatt ............................ 408/112 |
| 2,529,988 | 11/1950 | Zempel ........................ 408/110 |
| 2,779,218 | 1/1957 | Edgerton ...................... 408/110 |
| 2,784,616 | 3/1957 | Quackenbush ................ 77/34.4 |
| 3,015,240 | 1/1962 | Hodnett ........................ 408/84 |
| 3,060,772 | 10/1962 | Crump .......................... 408/202 |
| 3,083,593 | 4/1963 | Cotter ........................ 408/115 R |
| 3,320,832 | 5/1967 | Jensen .......................... 408/112 |
| 3,620,635 | 11/1971 | DalBlanco .................... 408/84 |
| 3,907,452 | 9/1975 | Tripp .......................... 408/56 |
| 5,054,968 | 10/1991 | Eckman ...................... 408/97 |
| 5,096,342 | 3/1992 | Blankenship et al. ........ 408/112 |
| 5,228,811 | 7/1993 | Potter .......................... 408/84 |
| 5,318,390 | 6/1994 | Dal Blanco .................. 408/84 |
| 5,743,683 | 4/1998 | Skaggs ........................ 408/97 |

*Primary Examiner*—Daniel W. Howell
*Attorney, Agent, or Firm*—Baker & Botts, L.L.P.

[57] ABSTRACT

A tool for removal of rivets includes three main sections—a tubular body section, a base, and a drive shaft assembly. The drive shaft assembly includes an upper portion to be received in the chuck of a rotational source of power and a lower portion to be received in the bore of the tubular body. An internally threaded drill receiving socket is disposed at a lower end of the lower portion of the drive shaft. The body section includes a coil spring for retracting the drill and a drill stop bushing for limiting the depth of penetration of the drill bit into the rivet. The base includes an upper disc and a larger diameter lower disc and three equally spaced tubular legs connect the upper disc to the lower disc. The bottom of the base includes a non-slip polymeric pad for contacting a work surface surrounding the rivet and stabilizing the cutting path of the drill.

4 Claims, 2 Drawing Sheets

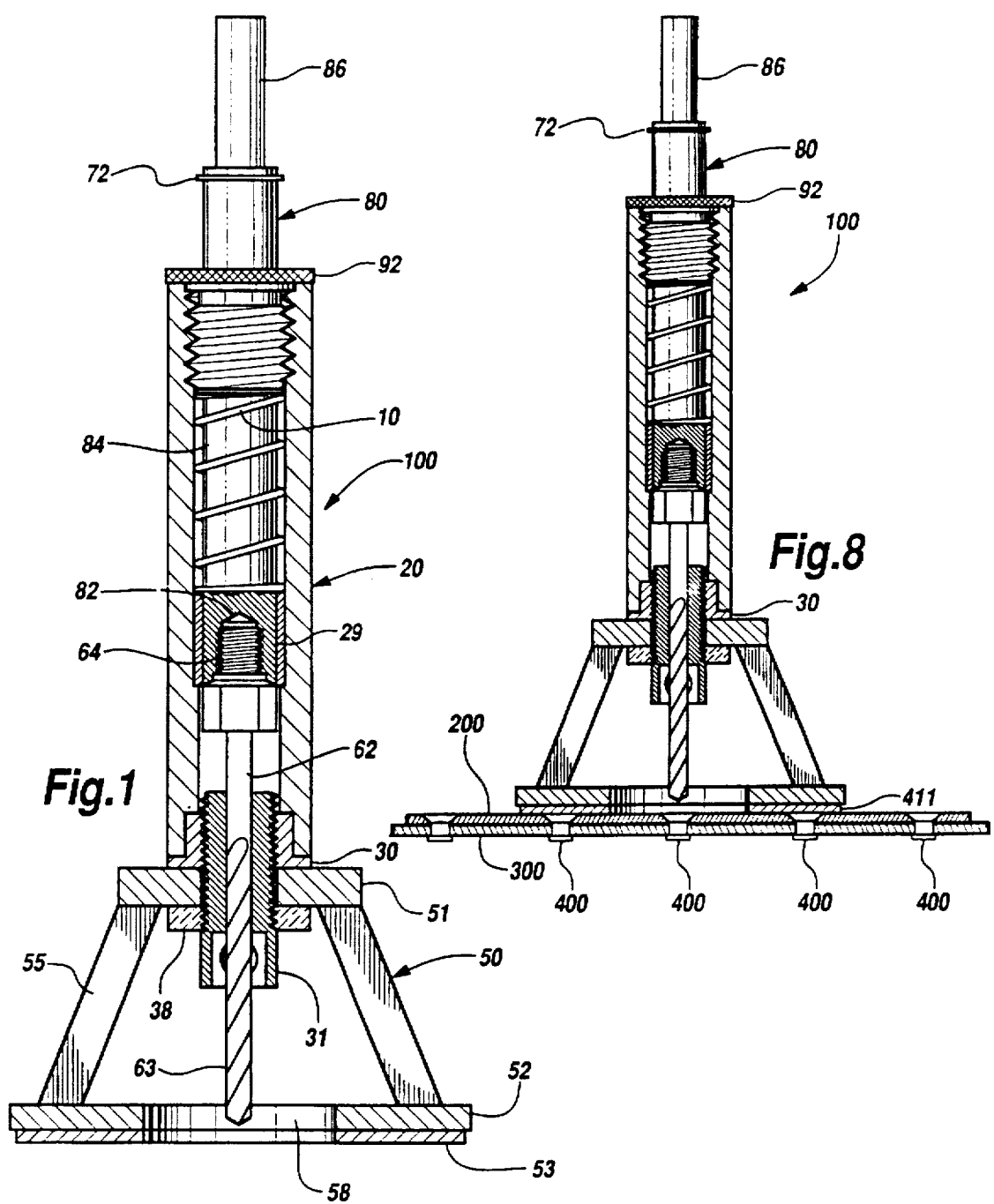
Fig.1
Fig.8
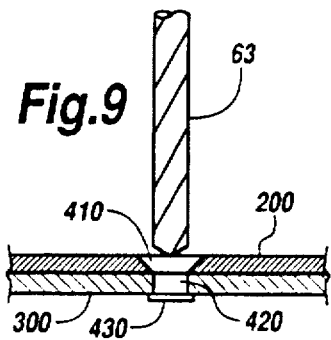
Fig.9
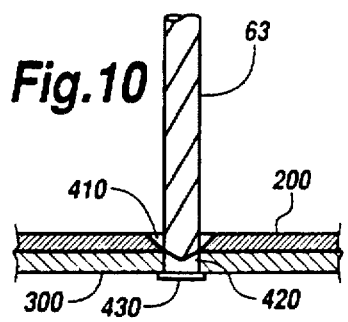
Fig.10
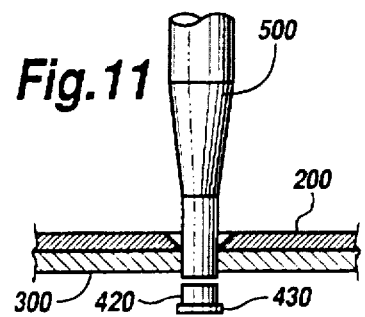
Fig.11

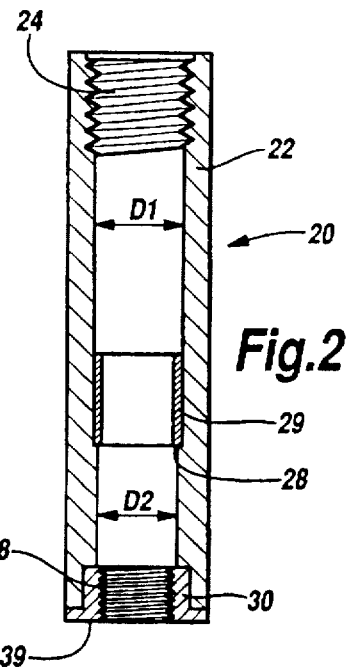
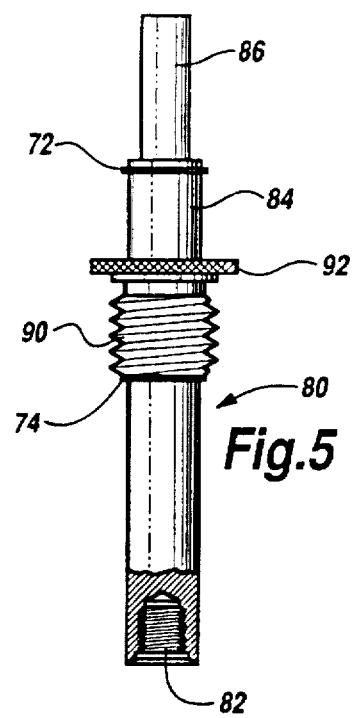
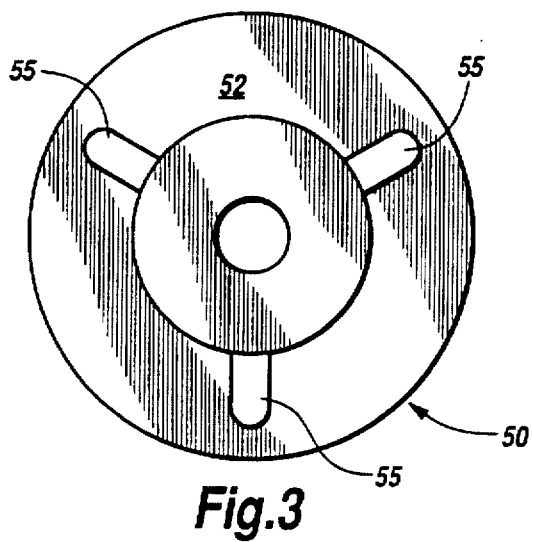
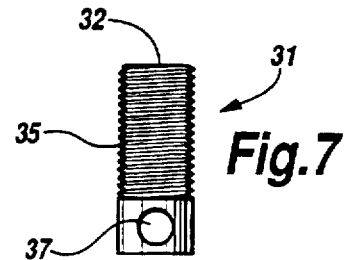
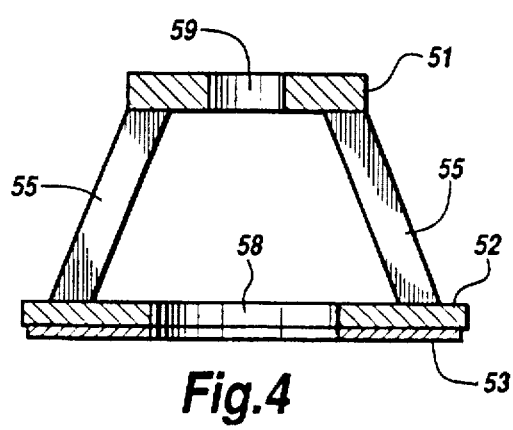
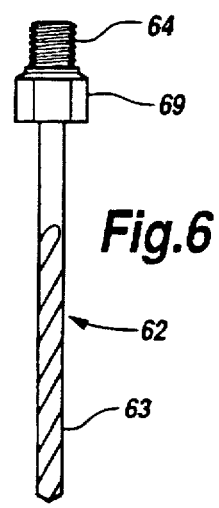

REMOVAL TOOL FOR FLUSH RIVETS

CROSS REFERENCE TO RELATED APPLICATIONS

This application is a continuation of application Ser. No. 08/674,141 filed Jul. 1, 1996 by John M. Skaggs and entitled "Removal Tool for Flush Rivets," now U.S. Pat. No. 5,743,683.

TECHNICAL FIELD

This invention relates generally to a tool for drilling and, more particularly, to a tool for removal of flush rivets also known as countersunk rivets.

BACKGROUND OF THE INVENTION

Riveting is a commonly used process for fastening parts together. There are several rivet head styles commonly utilized including flush (countersunk head), round head and universal head. The majority of rivets are produced from a ductile metal and consist of a head and a solid cylindrical shank. To fasten two or more parts together, the shank portion of a rivet is inserted into two or more properly sized, concentrically aligned holes. The rivet is then upset or squeezed to make installation permanent.

Rivets are generally installed with the intent of securing parts together for the duration of the parts' life cycle. However, parts frequently must be refastened or removed and replaced for a number of reasons including: replacing faulty component parts, replacing loose rivets, deformation or open seams between components and bulging due to trapped drill shavings or other foreign matter.

Flush rivets, in particular, pose a significant challenge for removal and replacement. The most common method for removal involves drilling through the head of a rivet then driving the shank portion out of the hole with a pin punch. Traditional techniques of rivet removal require a highly skilled drill operator in order to avoid elongation of the holes. If the holes are elongated, the holes must be enlarged to accept oversized fasteners. In many cases, parts must be scrapped because the edge distance after oversizing is not sufficient for the application. Elongation occurs because it is difficult to center and orient a drill with flush rivets.

In many hole drilling operations performed by hand drilling machines it is accepted practice to use a drill guide surrounding the cutting end of a twist drill for the purpose of stabilizing the drilling operation. Examples include the tools described in U.S. Pat. No. 1,023,002; U.S. Pat. No. 2,296,087; U.S. Pat. No. 2,360,942; U.S. Pat. No. 2,372,398; U.S. Pat. No. 3,620,635; U.S. Pat. No. 5,228,811 and U.S. Pat. No. 5,318,39.

On aircraft panels fastened with flush rivets, using a type of bit guide that seats adjacent to the perimeter of the rivet head is undesirable as it may scar and degrade the material in the countersunk region. Additionally, such a device does not control the path of the drill since it does not orient the drill perpendicular to the rivet head. On the exterior of aircraft, flush heads are commonly shaved and blended to match the skin contour. For these rivets a seam does not exist, thus it is not possible to seat a bit guide around the periphery. Since the prior art does not provide a reliable tool for establishing perpendicularity of a drill with respect to these rivet heads, a removal opening is likely to be drilled on an angle such that the periphery of the existing holes is damaged. The present invention overcomes these limitations by adapting and improving the use of drill guides.

SUMMARY OF THE INVENTION

The present invention comprises a tool for removal of flush rivets also known as countersunk rivets. Used in conjunction with a portable drill or suitable rotating power source, the tool includes three main sections—a tubular body section, a base and a cylindrical drive shaft assembly.

The tubular body section includes a cylindrical bore having a first predetermined diameter in an upper portion of the bore and a smaller second diameter in a lower portion of the bore. The change in diameter occurs abruptly thereby forming a ledge in the bore. The upper portion of the bore is internally threaded at a top end and includes an internal cylindrical bushing landed in the ledge of the bore. An internally threaded bottom bushing is press fit in the lower portion of the bore of the tubular body.

The base includes an upper disc and a larger diameter lower disc. Three equally spaced tubular legs connect the upper disc to the lower disc. The upper disc has an opening for passage of a drill stop bushing. The lower disc has an opening for passage of the drill bit. The opening in the lower disc is of sufficient size to allow viewing the entire rivet head to assist in centering the rivet removal tool over the rivet to be removed. The bottom of the base may include a non-slip polymeric pad for contacting a work surface.

The cylindrical drive shaft includes an upper shaft sized to be received in the chuck of a conventional pneumatic or electric drill, and a lower shaft sized to be received in the lower portion of the bore of the tubular body. An internally threaded drill receiving socket is integral with the lower end of the lower shaft of the drive shaft. A first retaining ring is assembled in a first groove on the drive shaft proximal to a top end. A second retaining ring is assembled in a second groove on the drive shaft located below the first groove. The drive shaft passes through the drive shaft bushing located between the first and second retaining rings. A coil retractor spring is positioned in the cylindrical bore of the body section. The lower end of the coil spring is seated on the top of the internal bushing and the upper end of the coil spring is seated against the lower retaining ring of the drive shaft.

A drill bit for use with the removal tool of the present invention has a conventional cutting section, a threaded shank and a hex-shaped head section. The threaded shank is sized to be received in the internally threaded drill receiving socket on the lower end of the drive shaft. The head section includes a flat surface for tightening the drill bit in place and serves as a drill travel limit stop. The present invention includes a drill stop bushing having an internal bore sized to allow ample clearance of the drill while minimizing the deflection in the cutting section and an externally threaded section for adjusting the depth of drill penetration into the rivet to be removed.

In the utilization of the tool of the present invention, the drill stop bushing is threaded into the bottom bushing of the tubular body section, passing through the opening of the top disc of the base and a jamb nut on the stop bushing secures the body section to the base. The shank of the drill bit is threaded into the receiving socket of the drive shaft and securely tightened.

BRIEF DESCRIPTION OF THE DRAWINGS

A more complete understanding of the present invention may be had by reference to the following Detailed Description when taken in conjunction with the accompanying drawings wherein:

FIG. 1 is a cross section view of the flush rivet removal tool of the present invention;

FIG. 2 is a partial cross section view of the cylindrical body section of the tool of FIG. 1;

FIG. 3 is a top view of the base for the tool of FIG. 1;

FIG. 4 is a cross section view of the base of the tool of FIG. 1;

FIG. 5 is a side view of the drive shaft of the tool of FIG. 1;

FIG. 6 is a side view of a drill bit for the tool of FIG. 1;

FIG. 7 is a side view of the drill stop bushing of the tool of FIG. 1;

FIG. 8 is a cross section view of the assembled tool of the present invention positioned for use in removal of a flush rivet; and FIGS. 9, 10 and 11 are a sequence of partial cross section views illustrating uses for the tool of the present invention.

DETAILED DESCRIPTION OF THE INVENTION

Reference is now made to the Drawings wherein like reference characters denote like or similar parts throughout the 11 Figures. Referring to FIG. 1, therein is shown a rivet removal tool 100 for use in conjunction with a portable drill or suitable rotating power source (not shown). The tool 100 includes three main sections—a tubular body section 20, a base 50 and a drive shaft assembly 80.

Referring now to FIG. 1 and FIG. 2, the body section 20 is illustrated in more detail. The body section subassembly includes a cylindrical tube 22, preferably constructed from aluminum alloy. The top end 24 of the cylindrical tube 22 is internally threaded for receiving a drive shaft bushing 90 (see FIG. 5). The lower end of the cylindrical tube 22 receives a press fit bottom bushing 30. The cylindrical tube 22 has an internal diameter D1 in the upper portion of the tube that is slightly greater than the internal diameter D2 of the lower portion of the cylindrical tube 22. The change in diameter is abrupt creating a ledge 28. An internal bushing 29 is press fit into the bore of the cylindrical tube 22 and is seated on the ledge 28. The internal bushing 29 has an internal bore sufficient to provide clearance for continuous rotation of the drive shaft assembly 80 (see FIG. 5). The bore of the cylindrical tube 22 has a surface finish to allow a coil spring 10 (see FIG. 1) to expand and compress without binding. The bottom bushing 30 is preferably machined from steel to minimize damage to the internal threads 38 due to repeated adjustment of a drill stop bushing 31 for depth of penetration of the drill bit 63 and repeated interchanging of different size drill stop bushings (FIG. 7). The bottom face 39 of the bottom bushing 30 is substantially perpendicular with respect to the internal bore to provide correct alignment for the mating top surface of upper disc 51 of base 50 (FIG. 4).

Referring now to FIGS. 1, 3 and 4, therein is illustrated the base 50. The base 50 includes the upper disc 51 and a larger diameter lower disc 52. In the preferred embodiment, three equally spaced legs 55 connect the upper disc 51 to the lower disc 52. The lower disc 52 has a central opening 58 for passage of the drill bit 62. The central opening 58 is of sufficient size to allow viewing of the entire rivet head to assist in centering the rivet removal tool 100 over the rivet to be removed. The bottom of the base 50 may include a non-slip polymeric pad 53 for contacting a work surface and thereby controlling the orientation of the drill bit 62 during operation of the tool 100. The upper disc 51 has a central opening 59 for passage of the drill stop bushing 31.

Now referring to FIG. 1 and FIG. 5, the drive shaft assembly 80 includes at a lower end an internally threaded drill receiving socket 82. The upper end 86 of the shaft is sized to be received in a standard drill chuck (not shown). The lower portion 84 of the drive shaft 80 is sized to be received in the bore of the cylindrical tube 22. A drive shaft bushing 90 slips over the lower portion 84 of the drive shaft 80 and is restricted to movement on the shaft by an upper retaining ring 72 and a lower retaining ring 74. The drive shaft bushing 90 includes a knurled ring 92 for tightening the bushing 90 in the internally threaded upper section 24 of the cylindrical tube 22 (see FIG. 1).

Referring now to FIG. 6, there is illustrated a typical drill bit 62 of the type for use in the removal tool of the present invention. The drill bit 62 has a conventional twist cutting section 63, a threaded shank 64 and a head portion 69. The cutting section 63 is sized smaller in diameter than the shaft of the rivet to be removed. This downsizing of the bit further minimizes the possibility of damaging the surrounding metal. The threaded shank 64 is sized to engage the internally threaded drill receiving socket 82 on the lower end of the drive shaft 80 and the head portion 69 has a hex-shaped configuration to tighten drill bit 62 in the tool and also serving as a drill stop.

Referring now to FIG. 7 there is illustrated a drill stop bushing 31, having an internal bore 32 sized to allow ample clearance of the drill bit 62 while minimizing deflection of the cutting section 63. The stop bushing 31 includes an externally threaded section 35 for adjusting the depth of drill penetration into the rivet to be removed. At least one opening 37 is present in the lower portion of the drill stop bushing 31 to facilitate bushing adjustments.

Returning to FIG. 1, therein is illustrated the assembled tool 100. The drill stop bushing 31 is threaded into the bottom bushing 30 of the cylindrical tube 22, passing through the central opening of the top disc 51 of the base 50. A jamb nut 38 secures the body section 20 to the base 50. The threaded shank 64 of the drill bit 62 is inserted into the receiving socket 82 of the drive shaft 80 and securely tightened. A different size drill bit 62 and drill stop bushing 31 are used for each size of rivet.

In order to adjust drill bit penetration depth, the drill stop bushing 31 is advanced into the bottom bushing 30 a predetermined distance sufficient to allow the drill bit 62 to penetrate the desired distance into the rivet head. The jamb nut 38 is tightened against the bottom face of the top disc 51 to secure the drill stop bushing 31 in the correct position.

A coil spring 10 is positioned in the bore of the cylindrical tube 22 of the body section 20 with the lower end seated on top of the internal bushing 29. The drive shaft assembly 80, including the drill 62, is inserted into the bore of the cylindrical tube 22. The drive shaft bushing 90 is assembled into an internally threaded top end 24 of the cylindrical tube 22 and secured in place by means of the knurled ring 92. The upper end of the coil spring 10 is seated against the lower retaining ring 74.

In operation, a rotating and downwardly directed force applied to the drive shaft 80 moves the shaft downward in the bore of the cylindrical tube 22, pushing the drill bit 62 through the drill stop bushing 31. The downward movement of the drive shaft 80 is stopped when the drill head 69 contacts the upper end of the drill stop bushing 31.

As the drive shaft 80 moves downward, the coil spring 10 is compressed between the top of the internal bushing 29 and the retaining ring 74. When the applied downward force is removed, the coil spring 10 retracts the drill bit 62 through the drill stop bushing 31.

Referring to FIGS. 8–11, there is illustrated the operation of the tool 100. As shown in FIG. 8, the tool 100 is positioned in contact with a preexisting part 200 with existing rivets 400. The non-slip polymeric pad 53 between the lower disc 52 and the pre-existing part 200 holds the tool 100 in place. The penetration depth is adjusted by loosening the jamb nut 38 and then advancing the drill stop bushing 31 in or out of the bottom bushing 30. When the desired setting for the drill stop bushing 31 is achieved, the jamb nut 38 is re-tightened against the top disc 51.

FIG. 9 illustrates the rivet 400 in detail. The rivet 400 includes a head section 410, a shaft 420 and a lower shank upset 430 for securing the rivet 400 in place. As illustrated in FIGS. 8-10, a rotational and downward force is applied to the drive shaft 80 forcing the drill bit 62 to penetrate the rivet head 410. The tool 100 is removed. As illustrated in FIG. 11, the remaining portion of the rivet shank 420 and the shank upset 430 are easily removed with a pin punch 500.

Although the preferred embodiment of the invention have been illustrated in the accompanying Drawings and described in the foregoing Detailed Description, it will be understood that the invention is not limited to the embodiment disclosed but is capable of numerous modifications without departing from the scope of the invention as claimed.

I claim:

1. A method for removing a rivet interconnecting at least two parts, said method comprising:

positioning a base having an anti-slip coating on the lower surface over the rivet, the base attached to a body of a drill stop bushing, said base and body having an internal bore to allow passage of a drill bit;

receiving the lower portion of a drive shaft in the internal bore of the body;

coupling the upper portion of the drive shaft to a source of rotational power;

receiving a drill in an internally threaded socket at an end of the lower portion of the drive shaft;

adjusting the drill stop bushing to limit the longitudinal movement of the drill bit;

rotating the drill bit through the internal bore of the base and the body;

penetrating a head of the rivet to the adjusted limit of the longitudinal movement of the drill bit; and retracting the drill bit to a predetermined position after penetration of the head of the rivet.

2. The method in accordance with claim 1 further comprising a step of removing a remaining portion of the rivet.

3. The method in accordance with claim 1 wherein the step of adjusting the drill stop bushing further includes adjusting the drill stop bushing to a predetermined location relative to the rivet.

4. A method for removing a countersunk rivet located on a panel of an aircraft comprising:

positioning a base having an anti-slip coating on the lower surface over the rivet, the base attached to a body of a drill stop bushing over the countersunk rivet, said base and body having an internal bore to allow passage of a drill bit;

receiving the lower portion of a drive shaft in the internal bore of the body;

coupling the upper portion of the drive shaft to a source of rotational power;

receiving a drill in an internally threaded socket at an end of the lower portion of the drive shaft;

adjusting the drill stop bushing to a predetermined location relative to the countersunk rivet;

rotating the drill bit in a downwardly direction and through the internal bore of the base and the body;

penetrating a head of the countersunk rivet with the drill bit;

adjusting the penetration of the head by the drill bit by controlling when a drill head of the drill bit contacts an upper end of the body;

retracting the drill bit to a predetermined position after penetration of the head of the rivet; and removing a remaining portion of the countersunk rivet.

* * * * *